(12) United States Patent
Chan et al.

(10) Patent No.: US 11,386,163 B2
(45) Date of Patent: *Jul. 12, 2022

(54) DATA SEARCH METHOD AND DATA SEARCH SYSTEM THEREOF FOR GENERATING AND COMPARING STRINGS

(71) Applicant: DELTA ELECTRONICS, INC., Taoyuan (TW)

(72) Inventors: Shih-Han Chan, Taoyuan (TW); Chao-Hsuan Ko, Taoyuan (TW); Guo-Cheng Lan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 182 days.

This patent is subject to a terminal disclaimer.

(21) Appl. No.: 16/529,820

(22) Filed: Aug. 2, 2019

(65) Prior Publication Data

US 2020/0081923 A1 Mar. 12, 2020

Related U.S. Application Data

(60) Provisional application No. 62/728,082, filed on Sep. 7, 2018.

(30) Foreign Application Priority Data

Feb. 1, 2019 (CN) .......................... 201910104937.6

(51) Int. Cl.
*G06F 16/903* (2019.01)
*G06F 16/9032* (2019.01)
(Continued)

(52) U.S. Cl.
CPC .. *G06F 16/90344* (2019.01); *G06F 16/90332* (2019.01); *G06F 40/30* (2020.01); *G09B 5/12* (2013.01)

(58) Field of Classification Search
CPC ............. G06F 11/1451; G06F 9/45558; G06F 16/128; G06F 2201/84; G06F 2009/45583;
(Continued)

(56) References Cited

U.S. PATENT DOCUMENTS 6,751,354 B2 6/2004 Foote et al.
7,242,809 B2 7/2007 Hunter et al.
(Continued)

FOREIGN PATENT DOCUMENTS

CN 101604324 A 12/2009
CN 104123332 A 10/2014
(Continued)

OTHER PUBLICATIONS

Semi-Supervised Recursive Autoencoders for Predicting Sentiment Distributions, Socker et al., 2012, p. 1-11, retrieved from the Internet URL: http://web.archive.org/web/20120601000000*/https://nlp.stanford.edu/pubs/SocherPenningtonHuangNgManning_EMNLP2011.pdf (Year: 2012).*

(Continued)

*Primary Examiner* — Vincent F Boccio
*Assistant Examiner* — Vy H Ho
(74) *Attorney, Agent, or Firm* — CKC & Partners Co., LLC (57) ABSTRACT

The present disclosure relates to a data search method and a data search system thereof. The data search method includes steps of: receiving a first learning content data, wherein the first learning content data includes multiple first learning sections; analysing the first learning content data by a way of Natural Language Processing to search multiple first keyword strings corresponding to each of the first learning content data; receiving a search message; analysing the search message by the way of Natural Language Processing
(Continued)

to generate a search string; comparing the search string with the first keyword strings; and generating a search list according to the first learning section, which corresponding to the first keyword string that matches the search string.

10 Claims, 6 Drawing Sheets

(51) Int. Cl.
*G06F 16/30* (2019.01)
*G09B 5/12* (2006.01)
*G06F 40/30* (2020.01)

(58) Field of Classification Search
CPC ............ G06F 2201/815; G06F 16/188; G06F 11/1448; G06F 11/1464; G06F 11/1484
See application file for complete search history.

(56) References Cited

U.S. PATENT DOCUMENTS

| | | | |
|---|---|---|---|
| 7,801,885 B1* | 9/2010 | Verma ................. | G06F 16/9535 707/758 |
| 8,107,541 B2 | 1/2012 | Divakaran et al. | |
| 9,607,224 B2 | 3/2017 | Tsai et al. | |
| 10,909,196 B1* | 2/2021 | Suzuki ................ | G06F 16/9535 |
| 2008/0226173 A1 | 9/2008 | Yuan et al. | |
| 2008/0288489 A1* | 11/2008 | Kim ....................... | G06F 16/334 |
| 2010/0057644 A1* | 3/2010 | Barton .................... | G06F 16/78 704/235 |
| 2012/0173577 A1 | 7/2012 | Millar et al. | |
| 2013/0166587 A1 | 6/2013 | Berry | |
| 2014/0223480 A1 | 8/2014 | Berry et al. | |
| 2015/0286718 A1* | 10/2015 | Wang ..................... | G06F 16/951 707/738 |
| 2015/0293995 A1 | 10/2015 | Chen et al. | |
| 2016/0239155 A1 | 8/2016 | Simakov | |
| 2016/0259888 A1* | 9/2016 | Liu ......................... | G16H 30/40 |
| 2017/0124192 A1* | 5/2017 | Cerveny ............. | G06F 16/9535 |
| 2018/0373724 A1* | 12/2018 | Novak ................... | G06F 3/048 |
| 2019/0163768 A1* | 5/2019 | Gulati ................... | G06F 16/583 |

FOREIGN PATENT DOCUMENTS

| | | |
|---|---|---|
| CN | 104572716 A | 4/2015 |
| JP | 2002-312370 A | 10/2002 |
| JP | 2006-003670 A | 1/2006 |
| JP | 2015-201185 A | 11/2015 |
| TW | 200411462 A | 7/2004 |
| TW | I512511 B | 12/2015 |
| TW | I521959 B | 2/2016 |
| WO | 2015068947 A1 | 5/2015 |

OTHER PUBLICATIONS

Sheng-syun Shen, Hung-yi Lee, Shang-wen Li, Victor Zue and Lin-shan Lee, "Structuring Lectures in Massive Open Online Courses (MOOCs) for Efficient Learning by Linking Similar Sections and Predicting Prerequisites", the 16th Annual Conference of the International Speech Communication Association (INTERSPEECH'15), Dresden, Germany, Sep. 6-10, 2015, p. 1363-1367.

Fujii A et al.: "LODEM: A system for on-demand video lectures", Speech Communication, Elsevier Science Publishers, Amsterdam, NL vol. 48, No. 5, May 1, 2006 (May 1, 2006), pp. 516-531, XP027926237, ISSN: 01 67-6393.

* cited by examiner

DATA SEARCH METHOD AND DATA SEARCH SYSTEM THEREOF FOR GENERATING AND COMPARING STRINGS

CROSS-REFERENCE TO RELATED APPLICATION

This application claims priority to U.S. Provisional Application Ser. No. 62/728,082 which is filed on Sep. 7, 2018, and priority to China Application Serial Number 201910104937.6, which is filed on filed Feb. 1, 2019, the disclosures of which are incorporated herein by reference in their entireties.

BACKGROUND

Technical Field

The present disclosure relates to a data search method and a data search system thereof, and more particularly to a technology capable of finding a corresponding learning content data in a database according to a search message.

Description of Related Art

"Online Learning Platform" is a network service that stores a large amount of learning content data in a server, allowing users to connect to the server via the Internet to view the learning content data at any time. At present, various types of learning content data are provided by various online learning platforms, such as videos, audio, presentation, documents or discussion forums, and the like.

Since the amount of learning content data stored in the online learning platform is very large, the user needs to input a search command according to his/her own needs in order to find related learning content data from the online learning platform. Therefore, whether the search mechanism of the online learning platform accurately identifies the search information of the user, and whether the search mechanism of the online learning platform may provide a corresponding learning content data to the user quickly and correctly will be a key indicator for determining the service performance of the online learning platform.

SUMMARY

One aspect of the present disclosure is a data search method, including steps of: receiving a first learning content data, wherein the first learning content data includes a plurality of first learning sections. Analyzing the first learning content data to generate a plurality of first keyword strings corresponding to the plurality of first learning sections. Receiving a search message. Analyzing the search message to generate a search string. Comparing the search string with the plurality of first keyword strings. Generating a search list according to the plurality of first learning sections corresponding to the plurality of first keyword strings matching the search string.

Another aspect of the present disclosure is a data search system, including a data storage device, a analysis device, a search string and an operation device. The data storage device is configured to store a first learning content data, wherein the first learning content data comprises a plurality of first learning sections. The analysis device is configured to generate a plurality of first keyword strings corresponding to the plurality of first learning sections according to the first learning content data. The analysis device is further configured to generate a search string according to a search message. The operation device is electrically to the analysis device. The operation device is configured to compare the search string with the plurality of first keyword strings, and generate a search list according to the plurality of first learning sections corresponding to the plurality of first keyword strings matching the search string.

Accordingly, since the data search system respectively analyzes the first learning sections of the first learning content data so as to create a first keyword string for indexing on each of the first learning sections, when receiving a search message, the data search system accurately searches for the first learning section corresponding to the first learning content data by comparing the search message with the first keyword string, so that user may quickly start browsing the learning content that he/she wants to search, so as to greatly improve the learning efficiency.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Currently, when a user inputs a search command in the online learning platform, the server only compares the search command with the file name, subtitles or tag (e.g., message) of the learning content data. However, if the content of the learning content data is too large (e.g., a movie with a length of two hours), the user still needs to manually adjust the learning content data (e.g., adjust the timeline to the 45 minute) to find out the section most relevant to his/her own needs. In addition, if the search message is too colloquial, the online learning platform probably searches for a unrelated learning content data because it unable identify the search message. That is, the search mechanism of the online learning platform cannot search in detail according to requirements of the user. The data search system and method provided by the present disclosure will improve this phenomenon.

Figure 1A:
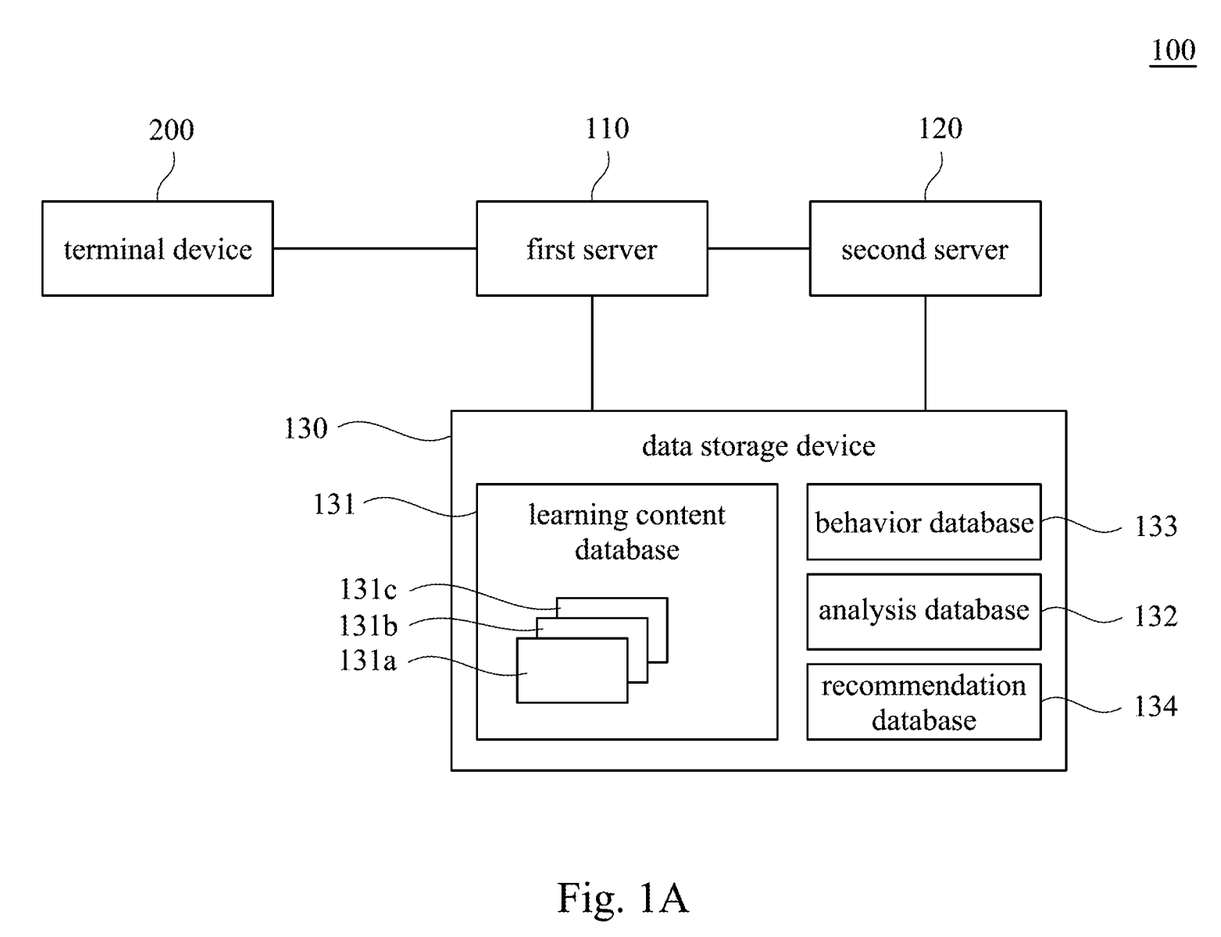
FIG. 1A is a schematic diagram of a data search system in some embodiments of the present disclosure.
Figure 1B:
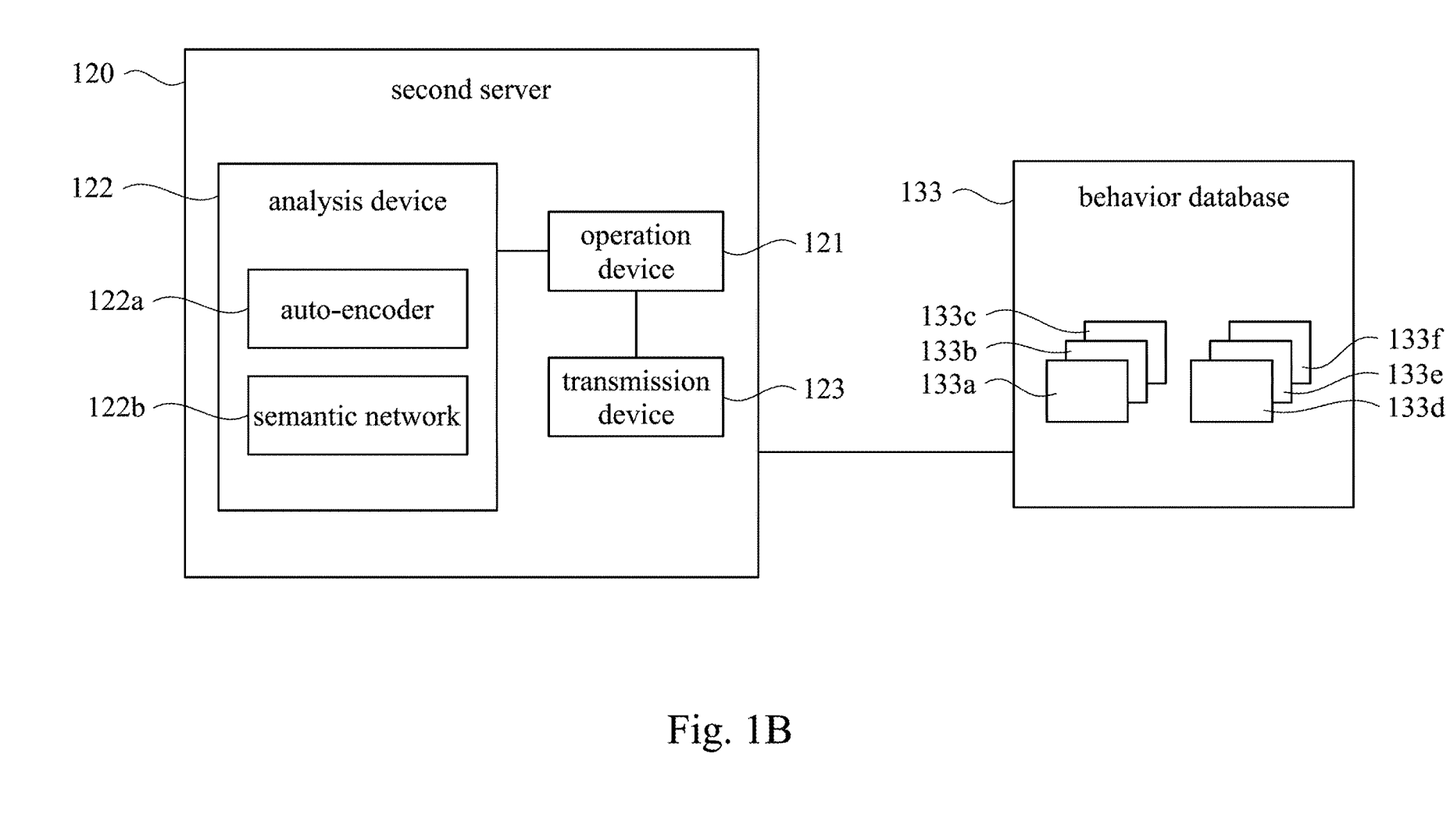
FIG. 1B is a schematic diagram of a first server and a behavior database in some embodiments of the present disclosure.

Refer to FIG. 1A and FIG. 1B, the present disclosure relates to a data search system 100. The data search system 100 includes a first server 110, a second server 120 and a data storage device 130. The first server 110 is electrically connected to the second server 120. In some other embodiments, the first server 110 and the second server 120 create a connection via the network for data transmission. The data storage device 130 is, such as a flash memory, a memory card, a hard drive. In some embodiments, the data storage device 130 is arranged to an independent server. In other some embodiments, the data storage device 130 is arranged to the first server 110 or the second server 120. In other embodiments, the first server 110 and the second server 120 may be integrated into a single server.

In the embodiment, the data search system 100 is configured to provide an online learning service. For example, user can connect to the first server 110 via a terminal device 200 to browse an online learning interface. When user want to browse some learning content data, the first server 110 may obtain a corresponding file from the data storage device 130. The second server 120 is used to perform functions such as classification, management, and statistics. However, the application of the present disclosure is not limited to this. The data search system 100 may also be applied to video streaming platforms or web discussion forums, etc.

The first server 110 is used to receive multiple learning content data. In some embodiments, the first server 110 receives the learning content data via the internet from the terminal device 200. The learning content data may be a video file, a sound file, a presentation or a discussion thread. For convenience of explanation, in the present embodiment, a plurality of learning content data are subdivided into a first learning content data 131a, a second learning content data 131b, and a third learning content data 131c. However, the disclosure is not limited thereto, and the amount of learning content data can be adjusted.

In some embodiments, when the first server 110 receives the first learning content data 131a, the first server 110 upload the first learning content data 131a to a learning content database 131 of the data storage device 130. The first learning content data 131a include multiple first learning sections. The first learning sections are arranged according to a time axis and linked to each other (e.g., a time axis is set in the first learning content data 131a). For example, if the first learning content data 131a is a 30-minute video file, the first learning content data 131a may include two first learning sections, and each of the first learning content data 131a corresponds to 15 minutes of the video file.

As shown in FIG. 1B, the second server 120 includes an operation device 121, an analysis device 122 and a transmission device 123. The operation device 121 is electrically connected to the analysis device 122 and the transmission device 123. The second server 120 transmits data to the first server 110 and the data storage device 130 via the transmission device 123. The second server 120 obtains first learning content data 131a form the data storage device 130 according to an analysis message transmitted by the first server 110 so as to perform a analysis processing. Then, according to the first learning content data 131a, The second server 120 generates multiple first keyword strings corresponding to each of the first learning section.

For example, the first learning content data 131a is a video file, and includes a subtitle file. The analysis device 122 may establish a semantic related string (or inference string) according to the words of the subtitle file by Natural Language Processing, and generate multiple first keyword strings corresponding to each of the first learning section. For example, "Projector, Image, Principle", "High-Frequency Signal, Sharpening, Enhancement" and "Upgrading, Sharpness". In some embodiments, the semantic related string may be a original text of the subtitle file, or be a inferred word. For example, if the subtitle file includes "Apple, memory, processor", the analysis device 122 can automatically infer "smart phone, iPhone". After the second server 120 generates the first keyword string, the second server 120 further stores the first keyword string to an analysis database 132 of the data storage device 130. In some other embodiments, the second server 120 further stores a first identification code corresponding to the first learning content data 131a in the analysis database 132, so that the first keyword string may correspond to the first learning content data 131a of the learning content database 131 according to the first identification code.

In some embodiments, the first learning content data 131a further includes a time axis data. Each of the first learning sections linked to each other according to the time axis data, so as to form the first learning content data 131a. The first server 110 correctly transmits the first learning section of the first learning content data 131a to the terminal device 200 according to the time axis data, so that user can start to browse the content of the first learning content data 131a at a correct time.

When the first server 110 receives a search message form the terminal device 200, the first server 110 transmits the search message to the second server 120. The second server 120 analyzes the search message by the analysis device 122 in order to generate a search string. For example, the search message is "The principle of the projector". The second server 120 breaks the search message to generate a search string "projector, principle" by analysis, extraction or inference.

The analysis device 122 is used to analyze the literal content provided by user, and obtain information such as people, things, things, places from the literal content, so that the developers can understand the true intentions of users and estimate the answers to the questions he/she truly want to ask. The analysis device 122 may break words to the search message, and create the word vector (e.g., via analysis module such as word2vec sentece2vec) to infer the similar words. In addition, the analysis device 122 may connect to the ontology network by internet to perform inference.

In some embodiments, the analysis device 122 includes an auto-encoder 122a. The second server 120 may receive multiple training data, and the analysis device 122 inputs the training data to the auto-encoder 122a to create a semantic network 122b by data compression processing and dimension conversion processing. The semantic network 122b is used to perform a Natural Language Analysis Processing to the first learning content data and the search message. The auto-encoder 122*a* may create a semantic network 122*b* by using deep learning. For example, the training data includes multiple original learning content data and multiple confirmed key strings. The auto-encoder 122*a* semantic analyzes the original learning content data, and transforms to embedded vector. Then, the auto-encoder 122*a* generates a corresponding weight value according to the confirmed key strings to create the semantic network 122*b*. Since the person in the field can understand the principle of semantic analysis, it will not be described here.

After the analysis device 122 semantic analyzes and obtains the search strings, the operation device 121 is used to compare the search string with the first keyword string, and generate a search list according to the first learning section corresponding to the first keyword string matching to the search string. For example, the search string "projector, principle" is similar to first keyword string "projector, image, principle", so the analysis device 122 arranges the corresponding first learning section to the search list for the user reference. Refer to FIG. 1A, if "the first keyword string corresponding to one of the first learning sections of first learning content data 131*a*" and "the second keyword string corresponding to one of the second learning sections of second learning content data 131*b* are similar to the search string, the operation device 121 will arrange both the two learning sections on the search list. The user can operate the terminal device 200, and choose the corresponding learning section on the online learning interface provided by the first server 110, and the first server 110 provides the corresponding learning section to the terminal device 200 (for example, a movie starts to play at the 15th minute).

Accordingly, since the data search system 100 respectively semantic analyzes each first learning section of the first learning content data 131*a* so as to create the first keyword string for indexing on each first learning section, when receiving the search message, the data search system 100 may compare the search message with the first keyword string so as to precisely search the corresponding first learning section of the first learning content data 131*a*. The user may quickly start browsing the learning content he/she want to find, and greatly improving learning efficiency. In addition, the data search system 100 also may store the analysis result of the search message and the first keyword string in a recommendation database 134. The data search system 100 generates a recommendation message according to the searched first learning content data 131*a* at a particular time (e.g., when user browse via a movie or inputs a question), and transmits the recommendation message to the terminal device 200 according to the searched first learning content data 131*a*. In some embodiments, the operation device 121 is further used to calculate multiple first similarities between the search string and the first keyword string. The first similarity is a matching level between the search string and each of the first keyword string. For example, If the search string is "projector, principle" and the first keyword string contains "projector", the first similarity is 50%. If the first keyword string contains "projector, principle", the first similarity is 100%. The operation device 121 may determine whether each first similarity bigger than a threshold value (e.g., 60%). Then, the operation device 121 only arranges the first learning section corresponding to the first keyword with a first similarity greater than the threshold value to the search list.

In some embodiments, the data search system 100 records the user operation as a "behavior data". The behavior data includes but is not limited to: video watch record, video mark record, note record, score record, share record, forum record, upload/edit video record, switch tab record. The second server 120 may adjust an order of the learning content data on the search list according to the user operation (behavior data).

As shown in FIG. 1A, in some embodiments, the data storage device 130 stores a first learning content data 131*a*, a second learning content data 131*b* and a third learning content data 131*c*. The second learning content data 131*b* include multiple second learning sections, and each of the second learning sections respectively includes the second keyword string. Similarly, the third learning content data 131*c* includes multiple third learning sections, and each of the third learning section respectively include own third key string. When user transmits an operation message, which corresponds to one of the second learning section in the second learning content data, to the data search system 100 by the terminal device 200, the first server 110 may receive the operation message and store the corresponding second keyword string to a behavior database 133 of the data storage device 130 so as to set the corresponding second keyword string as a behavior data. In some other embodiments, the operation device 121 records the second keyword string as the behavior data, after receiving the operation message. As shown in FIG. 1B, when user sends different operation messages multiple times, the behavior database 133 records multiple corresponding behavior data 133*a* to 133*c*.

After the operation device 121 searches and finds out the first similarity greater than the threshold value, the operation device 121 further analyzes the searched first keyword string (e.g., corresponds to the search string) according to the behavior data 133*a* to 133*c* of the behavior database 133, and calculates multiple second similarities (e.g., compare the similarity of sentences) between the behavior data 133*a* to 133*c* and the first keyword string. The second similarities correspond to the behavior data and each of the first keyword strings. For example, the operation device 121 first compares the search message "projector" and multiple the first keyword strings so as to search and find out two of the first keyword strings "projector, principle" and "projector, sharpness". Then, the operation device 121 determines that the behavior database 133 stores a behavior data "sharpness". It means user has viewed a learning content data related to "sharpness" in the past. At this time, the operation device 121 determines the second similarity between the behavior data "sharpness" and the first keyword string "projector, sharpness" is bigger. When the operation device 121 generates a search list, the operation device 121 arranges the first learning section corresponding to the first keyword string "projector, sharpness" before the first learning section corresponding to the first keyword string "projector, principle".

In some other embodiments, when the first server 110 or the second server 120 records the second keyword string as behavior data 133*a* to 133*c*, the first server 110 or the second server 120 further respectively records respectively own weight value 133*d* to 133*f* of behavior data 133*a* to 133*c* according to an amount of times the second keyword string is recorded in the behavior database 133. For example, user has viewed one of the second learning sections of second learning content data 131*b* three times. Therefore, the second keyword string corresponding to the second learning section will be recorded three times, and the weight value of its corresponding behavior data will be larger (for example, +3). The operation device 121 adjusts the second similarities according to the weight values. For example, if the operation device 121 compares the two first keyword strings with the different behavior data 133a to 133c in the behavior database 133, and the two second similarities are both "40%", but one of the first keyword strings corresponds to the behavior. The weight values 133d to 133f of data 133a to 133c are higher. The operation device will adjust the corresponding second similarities (For example, +10%) to arrange the first learning section corresponding to the first keyword string before another first learning section in the search list. Accordingly, the search list may be more personalized and recommended based on the content of data that user has viewed in the past.

The above operation message may be a viewing record, a movie mark record (e.g., tag "important"), notes, ratings, sharing actions, messages, and the like of the learning content data. In some embodiments, the operation message makes the operation device 121 to transmit the second learning content data 131b to the terminal device 200 for browsing. In some embodiments, the operation message makes the operation device 121 to write a comment data in the learning content database 131. The comment data corresponds to the second learning content data 131b, which can be study notes, comments, ratings, sharing, questions, discussion areas or annotations by user.

In some embodiments, the analysis device 122 recognizes the first learning section according to the metadata in the first learning content data 131a. The metadata is information used to describe the property of data, which can be viewed as field data in first learning content data 131a. For example, a title, a keyword, a summary, a tag, a discussion, a reply, etc of a video file. The analysis device 122 may identify the first learning section according to the metadata, and then perform semantic analysis respectively.

In some embodiments, the operation device 121 further binary encodes the metadata in the first learning content data 131a by using word embedding technology, and then stores the first learning content data 131a into the data storage device 130.

The foregoing method of identifying the learning section by using the metadata confirms the learning section according to the predetermined field in the first learning content data 131a. In some other embodiments, the first learning section may be divided on the first learning content data 131a after being analyzed by the operation device 121. For example, the operation device 121 may add a first segmentation mark to the first learning content data 131a to divide a plurality of first learning sections.

Figure 2:
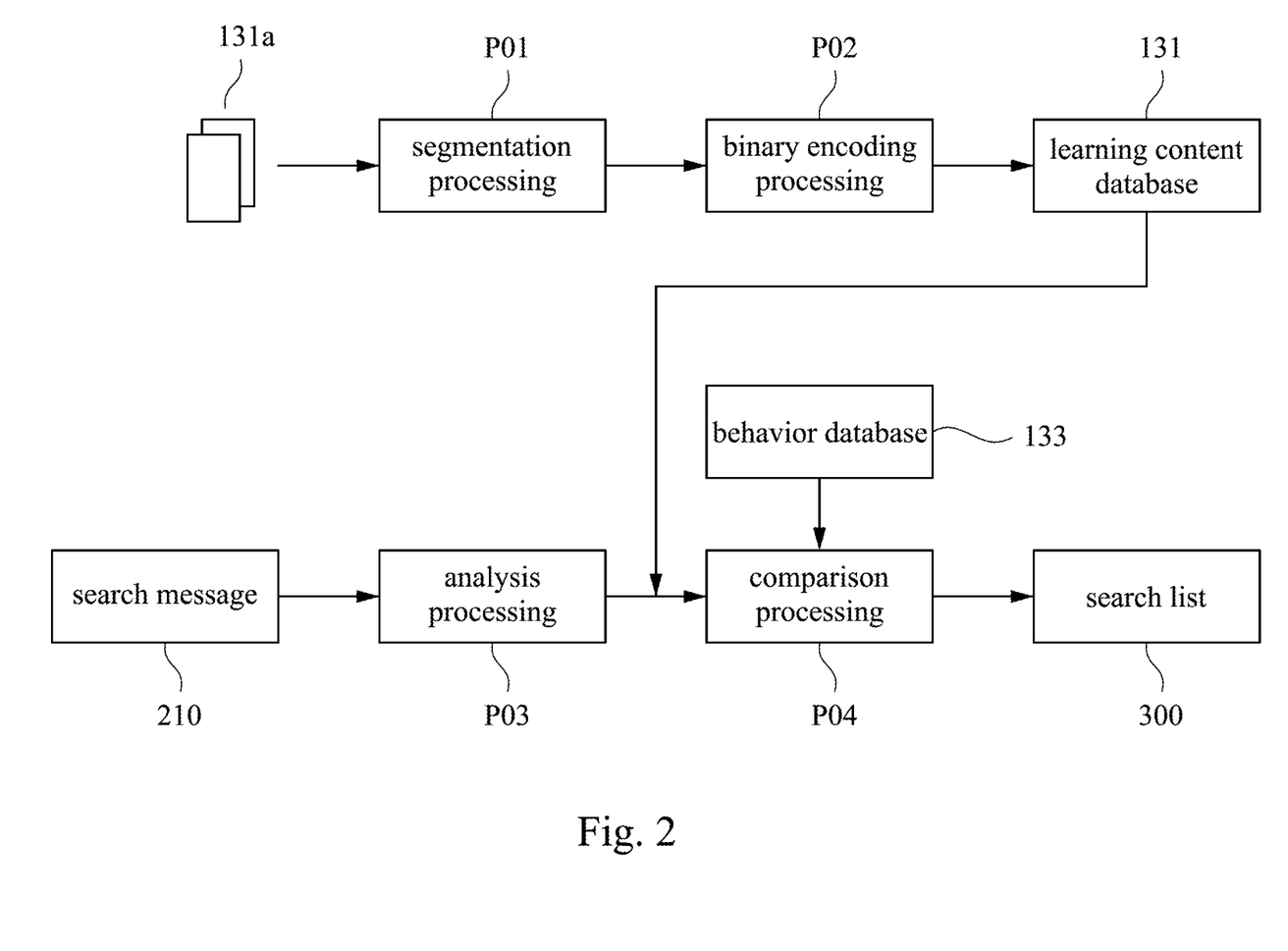
FIG. 2 is a schematic diagram of a operation method of the data search system in some embodiments of the present disclosure.

Refer to FIG. 2, FIG. 2 is a schematic diagram of a operation method of the data search system in some embodiments of the present disclosure. The data search system 100 is configured to receive the first learning content data 131a and the search message 210, respectively. The data search system 100 sequentially performs segmentation processing P01 and binary encoding processing P02 on the first learning content data 131a, and stores it in the learning content database 131 to create an index. Then, after the data search system 100 receives the search message 210, the data search system 100 performs the analysis processing P03, such as semantic analysis or metadata analysis, on the search message, and then performs the comparison processing P04 on the indexed first learning content data 131a (containing the analyzed first keyword string) and the analyzed search message 210. The search list 300 is generated according to the behavior data in the behavior database 133.

Figure 3A:
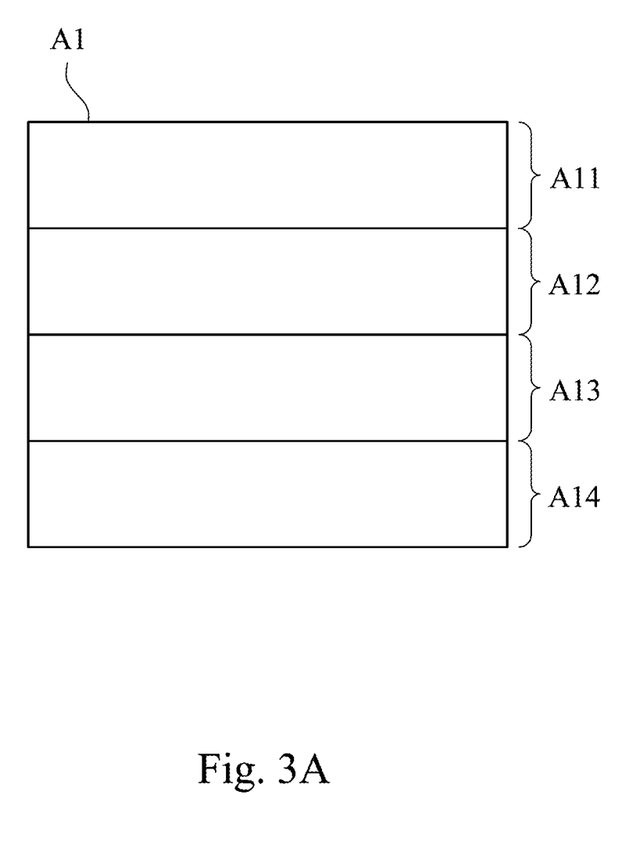
FIG. 3A is a schematic diagram of a literal data of the first learning content data in some embodiments of the present disclosure.

The following describes the generation method of the segmentation mark. Refer to the FIG. 1A and FIG. 3A. FIG. 3A is a schematic diagram of a literal data of the first learning content data in some embodiments of the present disclosure. In some embodiments, the first learning content data 131a includes a literal data A1 (e.g., subtitle). The second server 120 analyzes the literal data A1 after receiving the first learning content data 131a. For example, a semantic analysis method is used to generate multiple feature sentences. The feature sentences have a sequential relationship, and then to determine the similarity between adjacent feature sentences to generate the first segmentation mark.

For example, after the literal data A1 is analyzed, the generated feature sentence includes "the projector adjusts the light-emitting device according to the image signal", "the light projected by the light-emitting device is reflected as an image", and "another type of projection In the machine." The first sentence and the second sentence have the same word "image, light", so the similarity is higher. The similarity between the second sentence and the third sentence is lower. Therefore, when the second server 120 determines that the adjacent feature sentence similarity is lower than a default value (e.g., no same words, or one of the sentences is a transition statement, such as "in other embodiments"), the second server 120 generates a First segmentation mark to divide the literal data A1 into multiple first learning sections A11 to A14.

In above embodiments, the feature sentences are generated from the literal data A1 by semantic analysis techniques, and the similarity between the characteristic sentences is analyzed, but the present disclosure is not limited thereto. In some embodiments, the processor in the second server 120 may also perform the binary encoding processing on the literal data A1, and then by the data comparison to determine the degree of similarity to create a feature sentence or determine the similarity between the feature sentences.

The literal data of the above embodiments is a subtitle of the video file or a text content of the presentation. If the text file is "discussion of the Internet forum", it can still be segmented by the same principle. Similarly, if the first learning content data 131a includes a sound file, the second server 120 can generate the literal data A1 by voice recognition, and then perform analysis processing to obtain multiple feature sentence.

Figure 3B:
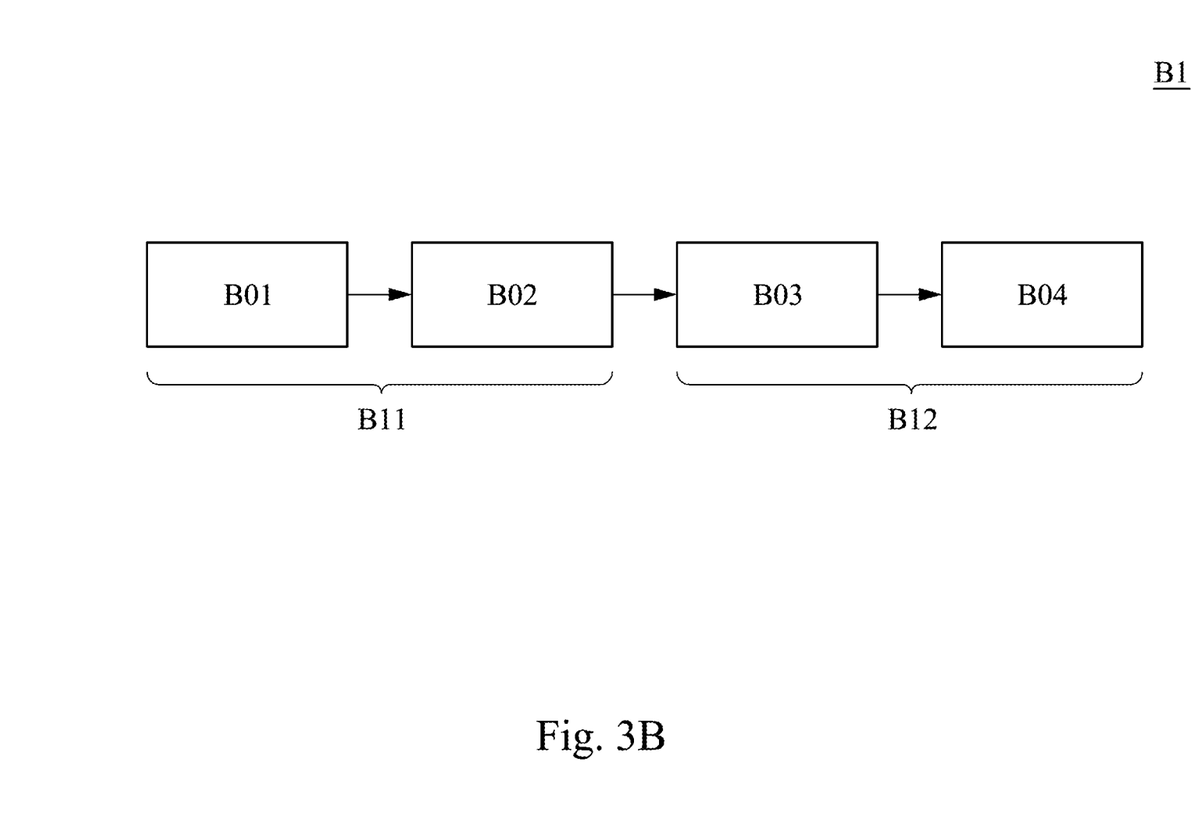
FIG. 3B is a schematic diagram of image screens of the first learning content data in some embodiments of the present disclosure.

In other embodiments, refer to FIG. 3B, the second learning content data 131b includes a video file B1. The video file B1 is further includes multiple image screens B01 to B04. The image screens B01 to B04 is multiple frame images that are connected in chronological order in the video file. The second server 120 is used to determine the similarity of adjacent image screens B01 to B04 to generate a first segmentation mark. For example, the image screens B01 to B02 is used to display the structure of the projector. The image screens B03 to B04 are used to display the path of the light projection. The similarity between image screens B02 and B03 is low, so the second server 120 adds a first segmentation mark between image screens B02 and B03 to form multiple first learning sections B11 and B12.

Refer to the FIG. 3A again. The following describes method of the first keyword string analyzed by the analysis device 122. The analysis device 122 performs analysis processing (e.g., semantic analysis) on the literal data A1 in the first learning content data 131a to obtain multiple feature words. Next, after the first learning content data 131a is divided into multiple first learning sections A11 to A14 or B11 to B12, the second server 120 determines an amount of the feature words in each of the first learning sections A11 to A14 or B11 to B12. When the amount is greater than a default setting, it is set to first keyword string. For example, one of the first learning section A11 of the literal data A1 includes the following: "The projector adjusts the light-emitting device according to the image signal, and the light projected by the light-emitting device is reflected as an image." The analysis device 122 breaks the above literal data to search and find out multiple words (e.g., projector, basis, video signal, adjustment, etc.). Among them, "image" appears twice, "lighting device" appears twice, and "projector, light" appear once. The analysis device 122 sets the feature word "image, light device" that appears twice as the first keyword string.

Similarly, after receiving the search message, the analysis device 122 can first break the literal data in the search message to obtain the search string, or the analysis device 122 sets words whose amount of occurrences greater than the default setting as the search string according to multiple words generated after break the literal data in the search message.

Figure 4:
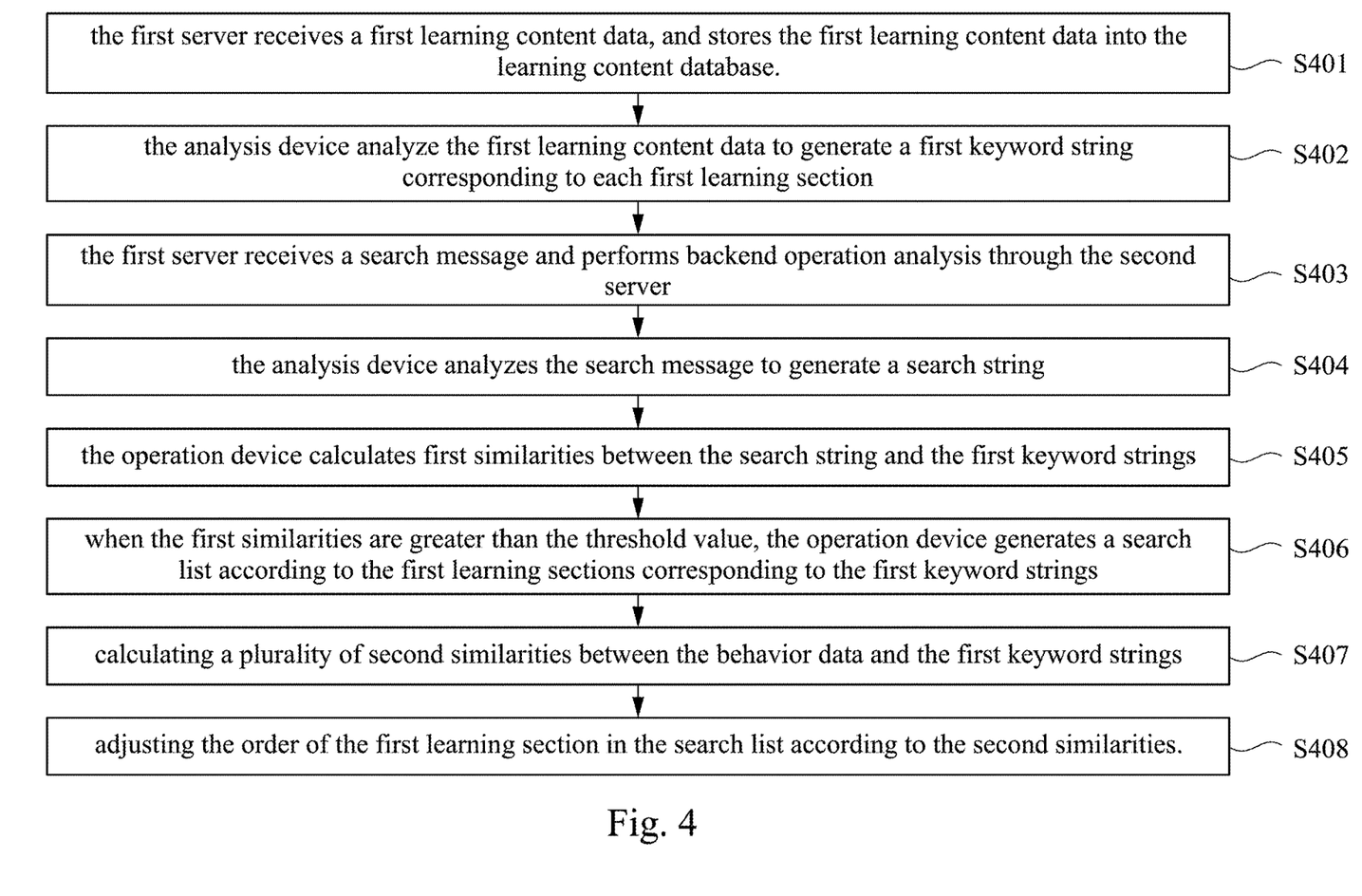
FIG. 4 is a schematic diagram of a data search method in some embodiments of the present disclosure.

Refer to FIG. 4, FIG. 4 is a schematic diagram of a data search method in some embodiments of the present disclosure. The data search method includes the following steps S401 to S409. In step S401, the first server 110 receives a first learning content data 131a, and stores the first learning content data 131a into the learning content database 131. The first learning content data 131a includes multiple first learning sections. In step S402, the second server 120 is connected to the data storage device 130, and the first learning content data 131a is analyzed by the analysis device 122 to generate a first keyword string corresponding to each first learning section. In some embodiments, the analysis device 122 searches for the first keyword string by semantic analysis techniques. In some other embodiments, the analysis device may also perform binary encoding processing on the first learning content data 131a to compare and search for the first keyword string according to metadata.

In step S403, the first server 110 receives a search message and performs backend operation analysis via the second server 120. In step S404, the analysis device 122 performs a semantic analysis to the search message to search for the search string. In step S405, the operation device 121 compares the search string and the first keyword strings to generate first similarities.

In step S406, when the operation device 121 determines the first similarities are greater than the threshold value, generating a search list according to the first learning sections corresponding to the first keyword strings. In step S407, compare the behavior data in the behavior database 133 with the first keyword strings searched in step S406 to generate a plurality of second similarities. In step S408, adjust the order of the first learning section in the search list according to the second similarities.

The foregoing steps are described in terms of the first learning content data 131a, but in other embodiments, the data search system 100 stores multiple learning content data 131a to 131c. The analysis device 122 performs a semantic analysis on each of the learning content data 131a to 131c to search for the corresponding keyword string. The operation device 121 compares the search string with each of the keyword strings in each of the learning content data 131a to 131c to find a learning section corresponding to the search string. For example, one of the first learning section of the first learning content data 131a is similar to the search string, one of the second learning sections of second learning content data 131b is related to the search string. The operation device 121 may display both learning sections in the search list.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A data search method, comprising steps of:
receiving, by a first server, a first learning content data, wherein the first learning content data comprises a plurality of first learning sections;
analyzing, by the first server, the first learning content data to generate a plurality of first keyword strings corresponding to the plurality of first learning sections;
receiving, by the first server, a search message;
analyzing, by a second server, the search message to generate a search string;
comparing, by the second server, the search string with the plurality of first keyword strings; and
generating, by the second server, a search list according to the plurality of first learning sections corresponding to the plurality of first keyword strings matching the search string so as to arrange the corresponding plurality of first learning sections to the search list for an user reference;
receiving, by the first server or the second server, an operation message, wherein the operation message is generated according to a viewing record of an user, corresponds to a second learning section of a second learning content data, and the second learning section comprises a second keyword string; and
storing, by the second server, the second keyword string corresponding to the operation message to a behavior database and recording as a behavior data;
calculating, by the second server, a plurality of second similarities between the behavior data and the plurality of first keyword strings matching to the search message;
recording a weight value of the behavior data according to a number of times that the second keyword string stored in the behavior database;
adjusting to the plurality of second similarities according to the weight value; and
adjusting, by the second server, an order of the plurality of first learning sections in the search list according to the plurality of second similarities, wherein the plurality of first learning sections with a higher of the plurality of second similarities is in a front portion of the search list;
wherein the data search method further comprises:
receiving a plurality of training data;
inputting the plurality of training data to an auto-encoder, and creating a semantic network by a data compression processing and a dimension conversion processing; and
semantic analyzing to the first learning content data and the search message by the semantic network;
wherein the order of the plurality of the first learning sections in the search list is adjusted according to the second similarities, and the second similarities are, in turn, adjusted according to the number of times that the second keyword string is recorded in the behavior database;
wherein the second similarities are calculated by determining how closely the second keyword string matches each of the first keyword strings.

2. The data search method of claim 1, further comprising steps of:
calculating a plurality of first similarities between the search string and the plurality of first keyword strings; and
generating the search list according to the plurality of first learning sections corresponding to the plurality of first keyword strings whose the plurality of first similarities are greater than a threshold value.

3. The data search method of claim 1, wherein in response to receiving the operation message, the operation device is configured to transmit the second learning content data to a terminal device.

4. The data search method of claim 1, wherein after receiving the first learning content data, identifying the plurality of first learning sections according to a metadata of the first learning content data.

5. The data search method of claim 4, further comprising a step of:
performs binary encoding processing to the metadata of the first learning content data by word-embedding.

6. A data search system, comprising:
a data storage device configured to store a first learning content data, wherein the first learning content data comprises a plurality of first learning sections;
an analysis device configured to generate a plurality of first keyword strings corresponding to the plurality of first learning sections according to the first learning content data; the analysis device further configured to generate a search string according to a search message; and
an operation device electrically connected to the analysis device, wherein the operation device is configured to compare the search string with the plurality of first keyword strings, and generate a search list according to the plurality of first learning sections corresponding to the plurality of first keyword strings matching the search string so as to arrange the corresponding plurality of first learning sections to the search list for an user reference;
wherein the data storage device further stores a second learning content data, and the second learning content data comprises a second learning section, the second learning section comprises a second keyword string;
wherein after receiving an operation message generated according to a viewing record of an user, the operation device is configured to store the second keyword string corresponding to the operation message to a behavior database and record as a behavior data;
wherein the operation device is configured to calculate a plurality of second similarities between the behavior data and the plurality of first keyword strings matching to the search message; the behavior database further stores a weight value, the weight value is a number of times that the second keyword string stored in the behavior database; the operation device is configured to adjust to the plurality of second similarities according to the weight value; the operation device is further configured to adjust an order of the plurality of first learning sections in the search list according to the plurality of second similarities, and the plurality of first learning sections with a higher of the plurality of second similarities is in a front portion of the search list;
wherein the analysis device further comprises an auto-encoder, the analysis device is configured to input a plurality of training data to the auto-encoder, and create a semantic network by a data compression processing and a dimension conversion processing;
wherein the order of the plurality of the first learning sections in the search list is adjusted according to the second similarities, and the second similarities are, in turn, adjusted according to the number of times that the second keyword string is recorded in the behavior database; and
wherein the second similarities are calculated by determining how closely the second keyword string matches each of the first keyword strings.

7. The data search system of claim 6, wherein the operation device is configured to calculate a plurality of first similarities between the search string and the plurality of first keyword strings, the operation device is further configured to generate the search list according to the plurality of first learning sections corresponding to the plurality of first keyword strings whose the plurality of first similarities are greater than a threshold value.

8. The data search system of claim 6, wherein in response to receiving the operation message, the operation device is configured to transmit the second learning content data to a terminal device.

9. The data search system of claim 6, wherein the analysis device is configured to identify the plurality of first learning sections according to a metadata of the first learning content data.

10. The data search system of claim 9, wherein the operation device is configured to performs binary encoding processing to the metadata of the first learning content data by word-embedding, and store the first learning content data to the data storage device.

* * * * *